United States Patent
Fritsch et al.

(10) Patent No.: US 12,261,806 B2
(45) Date of Patent: Mar. 25, 2025

(54) UNDERSTANDING SOCIAL MEDIA USER BEHAVIOR

(71) Applicant: GET IT FIRST, INC., Malibu, CA (US)

(72) Inventors: Bernhard Fritsch, Malibu, CA (US); Seyedmohammadreza Hashemifesharaki, Playa Del Rey, CA (US)

(73) Assignee: I3 Technology Management LTD., Malibu, CA (US)

( * ) Notice: Subject to any disclaimer, the term of this patent is extended or adjusted under 35 U.S.C. 154(b) by 0 days.

(21) Appl. No.: 18/307,652

(22) Filed: Apr. 26, 2023

(65) Prior Publication Data

US 2024/0080280 A1 Mar. 7, 2024

Related U.S. Application Data

(63) Continuation of application No. 16/053,474, filed on Aug. 2, 2018.

(51) Int. Cl.
| | | |
|---|---|---|
| *H04L 51/02* | (2022.01) | |
| *G06F 11/34* | (2006.01) | |
| *G06F 16/2457* | (2019.01) | |
| *G06F 16/951* | (2019.01) | |
| *G06F 16/9535* | (2019.01) | |

(Continued)

(52) U.S. Cl.
CPC .......... *H04L 51/02* (2013.01); *G06F 11/3438* (2013.01); *G06F 16/24578* (2019.01); *G06F 16/951* (2019.01); *G06F 16/9535* (2019.01); *G06N 3/04* (2013.01); *G06N 3/10* (2013.01); *G06N 5/04* (2013.01); *G06N 20/00* (2019.01);

(Continued)

(58) Field of Classification Search
CPC ............ G06N 20/00; G06N 3/04; G06N 3/10; G06N 5/04; G06F 16/951; G06F 11/3438; G06F 16/9535; G06F 16/24578; G06Q 50/01; G06Q 30/269; H04L 51/02; H04L 51/32; H04L 67/22; H04L 67/306
See application file for complete search history.

(56) References Cited

U.S. PATENT DOCUMENTS

| | | | |
|---|---|---|---|
| 5,900,634 A | 5/1999 | Soloman | |
| 9,632,972 B1 | 4/2017 | Moxley et al. | |

(Continued)

FOREIGN PATENT DOCUMENTS

| | | |
|---|---|---|
| WO | 2017098519 A1 | 6/2017 |
| WO | 2017145008 A1 | 8/2017 |

(Continued)

OTHER PUBLICATIONS

Jianshu Weng et al. 2010. TwitterRank: finding topic-sensitive influential twitterers. In Proceedings of the third ACM international conference on Web search and data mining (WSDM '10). Association for Computing Machinery, New York, NY, USA, 261-270. https://doi.org/10.1145/1718487.1718520 (Year: 2010).*

(Continued)

*Primary Examiner* — Andrew L Tank
(74) *Attorney, Agent, or Firm* — Heidi Eisenhut; LOZA & LOZA, LLP

(57) ABSTRACT

Aspects of the present invention relate to computer processes adapted to identify influencers and other users interested in certain topics and uses thereof.

20 Claims, 6 Drawing Sheets

(51) Int. Cl.
*G06N 3/04* (2023.01)
*G06N 3/10* (2006.01)
*G06N 5/04* (2023.01)
*G06N 20/00* (2019.01)
*G06Q 50/00* (2024.01)
*H04L 51/52* (2022.01)
*G06Q 30/0251* (2023.01)

(52) U.S. Cl.
CPC .............. *G06Q 50/01* (2013.01); *H04L 51/52* (2022.05); *G06Q 30/0255* (2013.01)

(56) References Cited

U.S. PATENT DOCUMENTS

| | | |
|---|---|---|
| 9,672,255 B2 | 6/2017 | Lange et al. |
| 9,849,364 B2 | 12/2017 | Tran et al. |
| 11,010,436 B1 | 5/2021 | Peng et al. |
| 2003/0174881 A1 | 9/2003 | Sinhard et al. |
| 2006/0229881 A1 | 10/2006 | Stemmle et al. |
| 2007/0223807 A1 | 9/2007 | Yankelevitz et al. |
| 2009/0018918 A1 | 1/2009 | Moneypenny |
| 2009/0063254 A1 | 3/2009 | Paul et al. |
| 2009/0164450 A1 | 6/2009 | Martinez et al. |
| 2011/0307478 A1 | 12/2011 | Pinckney et al. |
| 2012/0158455 A1 | 6/2012 | Pathak et al. |
| 2012/0324004 A1 | 12/2012 | Le et al. |
| 2013/0159507 A1 | 6/2013 | Mason et al. |
| 2013/0254202 A1 | 9/2013 | Friedlander |
| 2014/0089402 A1 | 3/2014 | Liyanage et al. |
| 2014/0189536 A1 | 7/2014 | Lange et al. |
| 2015/0025903 A1 | 1/2015 | Mueller-Wolf |
| 2016/0012344 A1* | 1/2016 | Flinn ..................... G06N 5/048 706/52 |
| 2016/0048556 A1 | 2/2016 | Kelly et al. |
| 2016/0171514 A1* | 6/2016 | Frank ..................... G06Q 30/02 705/7.29 |
| 2017/0011460 A1 | 1/2017 | Molinari et al. |
| 2017/0116284 A1* | 4/2017 | Champaneria ........ G06F 16/951 |
| 2017/0171139 A1* | 6/2017 | Marra ................... H04L 51/214 |
| 2017/0230189 A1 | 8/2017 | Toll et al. |
| 2018/0067945 A1* | 3/2018 | Jain ........................ G06F 16/35 |
| 2018/0068019 A1 | 3/2018 | Novikoff et al. |
| 2018/0094953 A1 | 4/2018 | Colson et al. |
| 2018/0096071 A1* | 4/2018 | Green .................. G06F 16/248 |
| 2018/0143980 A1 | 5/2018 | Tanikella et al. |
| 2018/0144256 A1* | 5/2018 | Saxena ................. G06N 20/00 |
| 2018/0218176 A1 | 8/2018 | Voorhees et al. |
| 2018/0218343 A1 | 8/2018 | Kolb et al. |
| 2018/0253496 A1* | 9/2018 | Natchu ................. G06F 16/951 |
| 2019/0034976 A1* | 1/2019 | Hamedi ............. G06Q 30/0243 |
| 2019/0043048 A1 | 2/2019 | Wright et al. |
| 2019/0102395 A1 | 4/2019 | Kshetramade |
| 2019/0188653 A1 | 6/2019 | Khaund |

FOREIGN PATENT DOCUMENTS

| | | |
|---|---|---|
| WO | 2018039374 A1 | 3/2018 |
| WO | 2018127923 A1 | 7/2018 |
| WO | 2019162653 A1 | 8/2019 |

OTHER PUBLICATIONS

Wu et al. "Sequential prediction of social media popularity with deep temporal context networks." arXiv:1712.04443 (2017).

* cited by examiner

UNDERSTANDING SOCIAL MEDIA USER BEHAVIOR

PRIORITY CLAIM

This patent application is a continuation application of and claims benefit of the filing date of co-pending U.S. application Ser. No. 16/053,474 entitled "Understanding Social Media User Behavior" filed Aug. 2, 2018, the disclosures of which are incorporated by reference herein in their entirety.

FIELD OF THE INVENTION

Embodiments of the present inventions relate to computer processes for developing an understanding of participants in a network and which participants influence other participants.

BACKGROUND

Social networks include a variety of types of participants. Social networks tend to be used for friend-to-friend communications, news gathering and distribution, group communications, ecommerce, etc. It is difficult to understand how all of the participants effect one another because the network influences and sources of information are difficult to ascertain. Improvements in the computer sciences directed at better understanding the participants in a network are needed.

SUMMARY

Aspects of the present invention relate to computer processes adapted to identify influencers and other users interested in certain topics and uses thereof. The computer processes create the ability for the principles of the present inventions (as described in more detail herein) to be carried out in an efficient and timely manner such that the many influencers and users that are influenced along a subject within a social network can be identified, followed, tracked, communicated with, targeted with advertisements, etc. These processes can be used to investigate hundreds of thousands and millions of users to find the ones that are interested or influential. These processes can further be used to identify such within hours, days, weeks, etc. such that live users and non-active users can be identified over time when desired.

Embodiments include computer systems, computer operated methods, computer products, systems including computer-readable memory, systems including a processor and a tangible, non-transitory memory configured to communicate with the processor, the tangible, non-transitory memory having stored instructions that, in response to execution by the processor, cause the system to perform steps in accordance with the disclosed principles, systems including non-transitory computer-readable storage medium configured to store instructions that when executed cause a processor to follow a process in accordance with the disclosed principles, etc.

Embodiments include such systems, methods, computer products, etc. that perform the steps of gathering module adapted to automatically, through an online connection to a social network, extract user information from a plurality of users in a social network and publically available contextual information relating to each of the plurality of users; a neural network generator adapted to develop an organized neural network map comprising the user information and contextual information, describing how the user information and contextual information is associated, and describing how each user of the plurality of users is associated with other users of the plurality of users and how the contextual information is associated with each of the plurality of users; a subject matter contextual search module adapted to identify, through a contextual search limited to a pre-determined subject matter on the neural network map, (1) influential users in the neural network that influence other users on the subject matter to form a subject matter limited neural network, (2) interested users that have an apparent interest in the subject matter, and (3) a hierarchical set of users that are directly and indirectly associated with the influential users and the interested users, wherein the subject matter contextual search module re-runs the search at least once per week to maintain an updated database of influencers and interested users; and a targeted communication manager adapted to engage the identified influential users in an advertisement targeted communication relating to the subject matter.

In embodiments, systems, methods, computer products, etc. further comprise a ranking step, wherein each of the identified influential users is ranked in accordance with their level of influence as determined by a scoring of the contextual information associated with each of the identified influential users. In embodiments, the scoring includes a plurality of instances of interactions relating to the search subject and each of the plurality of instances are attributed a grade based on a level of engagement with the subject matter. In embodiments, the plurality of instances are used to generate an overall grade for the user, wherein the overall grade indicates the level of influence the user has with others relating to the search subject. In embodiments, the targeted communication manager adapts a communication message to each of the plurality of users based on the overall grade, wherein the adapted message includes adapting a timing of the delivery of the message based on the activity of a user. In embodiments, the contextual search module is adapted to receive a search subject and then to search through the contextual information pertaining to each of the plurality of users looking for an indication of interest in the search subject. In embodiments, the indication of interest is based on a grading system, wherein the contextual information for each user includes a plurality of instances of interactions about the search subject and each of the plurality of instances are attributed a grade based on a level of engagement with the search subject. In embodiments, the plurality of instances are used to generate an overall grade for the user, wherein the overall grade indicates the level of interest the user has with the search subject. In embodiments, the targeted communication manager engages a user from the plurality of users at a level based on the overall grade of the user.

In embodiments, systems, methods, computer products, etc. include a subject matter limited neural network map identifying a subset of users selected from a plurality of users of a social network that have been identified as being interested in a search subject based on a contextual search of publically available contextual information relating to each of the plurality of users, wherein the contextual information comprises time stamps indicative of when the contextual information was generated; and a targeted communication manager adapted to determine at what time it would be effective, based on the time stamps, to distribute a communication relating to the search subject to the subset of users. In embodiments, the effective time is a time of day and the targeted communication manager determines the effective time based on when the time stamps indicate that the user has been active in the social network and engaging with content related to the search subject.

In embodiments, the systems, methods, computer products, etc. may include a subject matter limited neural network map describing a subset of users selected from a plurality of users of a social network that have been identified as being interested in a search subject based on a contextual search of publically available contextual information relating to each of the plurality of users, wherein the contextual information comprises indications of a time of activity of each of the subset of users; and a targeted communication manager adapted to determine at what time it would be effective, based on the indications of time of activity, to distribute a communication relating to the search subject to the subset of users. In embodiments the targeted communication manager is further adapted to distribute the communication to each of the subset of users at a time based on each individual's indication of time of activity.

In embodiments, systems, methods, computer products, etc. include a targeted communication manager adapted to run a communication targeted communication through a plurality of influencers in a social network, wherein the plurality of influencers are selected by evaluating publically available contextual information relating to users in the social network to identify users that influence other users in a topic area relating to a pre-defined search subject; and an evaluation module adapted to, following the running of the targeted communication, collect newly generated, since the time when the targeted communication was run, publically available contextual information from users in the social network and searching the contextual information for information relating to the search subject to generate a neural network map of the user's impressions of the targeted communication; and a effectiveness grading module adapted to review newly the newly generated contextual information in relation to the neural network map to grade the activity of each user in relation to the targeted communication and calculating an overall effectiveness of the targeted communication based on the activity of each user. In embodiments, a sentiment of each user is derived from the activity of each user and the overall effectiveness of the targeted communication includes an overall indication of the group's sentiment.

In embodiments, systems, methods, computer products, etc. include a neural network generator adapted to generate a neural network map of a social network, the neural network map including a plurality of users and publically available contextual information relating to each of the plurality of users, the contextual information including a plurality of user posts; and a contextual search module adapted to evaluate each of the plurality of user posts for value as it relates to a search subject, the value comprising a relative scale indicative of the user's level of engagement with the search subject. In embodiments, the value of each of the plurality of posts is combined to generate a user value.

In embodiments, systems, methods, computer products, etc. include a subject matter limited neural network map identifying a user selected from a plurality of users of a social network that have been identified as being interested in a search subject based on a contextual search of publically available contextual information relating to each of the plurality of users; and an agent programmed to interact with the identified user, wherein the interaction is based on the search subject. In embodiments, the agent is programmed to learn from interactions with the user and refine the agent's interactions with the user. In embodiments, the agent is programmed to learn from interactions with users that exhibit similar characteristics to the identified user and refine the agent's interactions with the user. In embodiments, the agent is programmed to automatically interact with the identified user, including replying to messages sent from the identified user to the agent. In embodiments, the agent is further programmed to accept human input to refine the agent's interactions. In embodiments, the agent is programmed to associate itself with the identified user in a private way such that the agent has access to the user's private data. In embodiments, the agent is further programmed to collect and analyze private data from the identified user that relates to the search subject. In embodiments, the agent is further programmed to categorize the identified user as being similar to a pre-defined profile.

In embodiments, systems, methods, computer products, etc. include a subject matter limited neural network map identifying a user selected from a plurality of users of a social network that have been identified as being interested in a search subject based on a contextual search of publically available contextual information relating to each of the plurality of users. In embodiments it further includes an agent programmed to interact with the identified user, wherein the interaction is adapted to gain information about the user's status. In embodiments, the information about the user's status provides an indication of how active the user is. In embodiments, the information about the user's status provides an indication of how active the user is with respect to the searched subject.

In embodiments, systems, methods, computer products, etc. include a subject matter limited neural network map identifying a user selected from a plurality of users of a social network that have been identified as being influential on a topic, wherein the user is identified through a search subject based on a contextual search of publically available contextual information relating to each of the plurality of users. It may further include an agent programmed to interact with the identified user, wherein the interaction is based on the search subject. In embodiments, the agent's interactions are adapted to gather information from the influential user indicative of the influential user's level of engagement with the search subject.

These and other embodiments, teachings, equivalents, etc. will become apparent upon reading the entire specification and such embodiments, teachings, suggestions, equivalents are intended to be captured by the principles of the present inventions.

BRIEF DESCRIPTION OF THE FIGURES

Features and advantages of the claimed subject matter will be apparent from the following detailed description of embodiments consistent therewith, which description should be considered with reference to the accompanying drawings.

DETAILED DESCRIPTION

Aspects of the present inventions relate to computer processes for developing an understanding of participants in a network and which participants influence other participants. In embodiments, a social network may be mapped to understand the relationships of the various participants. The mapping may also involve collecting, organizing and understanding publically available information relating to the participants to gain an understanding of how they either influence others or are influenced by others. Sources of influence can be assessed based on a particular subject matter interest. For example, computer systems in accordance with the principles of the present inventions may help one understand who are the influencers in a social network on a particular trending topic. A particular entity may describe themselves as an influencer, but studying the underlying publically available data within the network may reveal that the entity is not particularly influential on the trending topic. Systems according to the principles of the present inventions may be used to discover that someone positioned as a 'follower' may actually be a rather important influencer in the network. Understanding who is actually influencing whom can be quite important in a social network. It can help identify good and bad actors, effective and non-effective users, properly target communications, advertisements and advertisers, etc. It can also help one understand how services and products are used and whether they need improvements.

Figure 1:
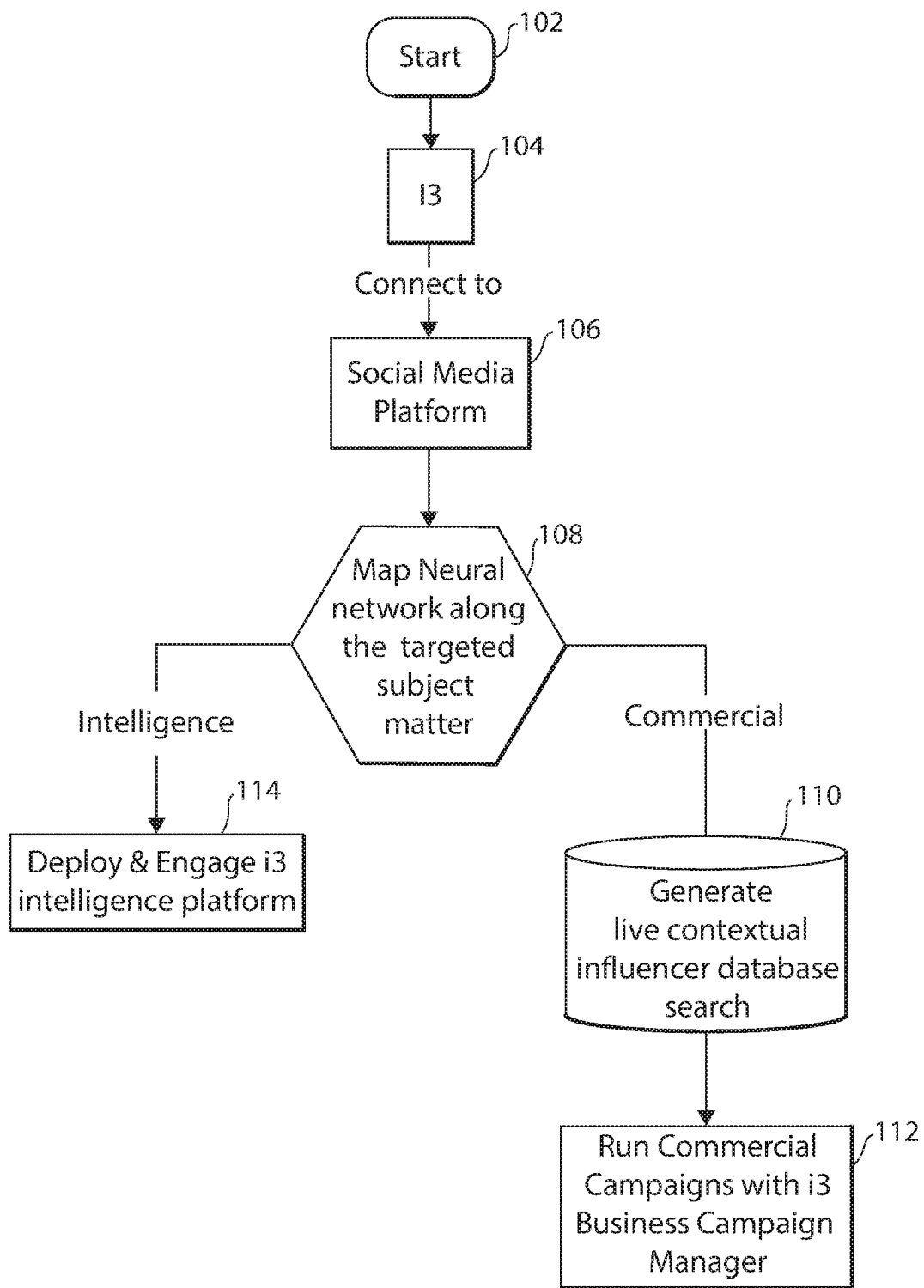
FIG. 1 illustrates a flow chart for a computer process for developing a subject limited neural network and running a commercial targeted communication and intelligence process in accordance with the principles of the present inventions.

FIG. 1 illustrates a computer process for running a commercial targeted communication (e.g. an advertisement campaign, political messaging, news reporting, sales information, conversation, interrogation, solicitation, etc.) based on identified subject matter influencers. It also illustrates a process for identifying and following users that are interested in a particular topic of interest. There are a number of categories of users. One type of user is a user that influences other users, generally referred to as an influencer. An influencer may be an entity that is paid to communicate in a particular way (e.g. a company selling a product, news organization, entertainment organization, communication organization, famous person that other users tend to listen to, advertiser, reseller, etc.), an entity that is not paid but nonetheless influences other users (e.g. a friend, expert, scholar, respected individual, etc.), etc. In embodiments, the influencers are further filtered down to identify the ones that are influential of a particular topic of interest (as described further herein). Another significant type of user is a user that can apparently be influenced by an influencer. This user may be referred to as a user interested in the subject matter. Users interested in the subject matter may be further filtered to identify their present state of mind, inclination, activity level, etc. on a particular topic of interest (as described further herein). For example, a user interested in the subject matter may be identified as ready to purchase something or act in a certain way that is of particular interest; this user may be referred to as a person of interest (POI) and distinguished in a targeted communication as compared to other users that are interested in the subject matter.

The process of FIG. 1 begins with an influencers computer program 104 that connects to a social network 106 (e.g. connecting through an online connection). Once connected, the influencers computer program 104 maps the social network to generate a neural network view of the social network (described in greater detail below) along a targeted subject matter or topic of interest 108. The mapping step 108 produces a database of influencers of the subject matter. The mapping step also may include an organization step where the data identifying users and contextual information relating to each user is arranged such that users connections to other users (e.g. either directly, such as a friend type relationship or a following type relations, or indirectly, such as through comments, forwarded messages, replies, requests for connection, etc.) are identified, contextual information directly relating to each user is identified and associated with the appropriate user, contextual information that indirectly associates users is identified and used to make connections to the appropriate users, etc. The database, in an organized form or unorganized form, can be updated frequently (e.g. hourly, daily, weekly) to maintain a highly accurate view of current influencers, creating a neural network that changes as the social network's influencers change or as the topics of interest change. The neural network also represents the levels of influence that each party may have. Contextual information obtained during the mapping 108 allows the influencers program 104 to understand how influential the various parties are. For example, the corporation Nike, Inc. (hereinafter the NIKE® corporation) may have a high level of influence over a group of users interested in sporting goods in the social network, but the program 104 may identify other companies, users and even followers that have significant influence over users. Each influencer may be graded to establish their calculated level of influence. An advertisement, or other communication targeted communication, can be run targeting the graded influencers in the neural network. High value influencers may be offered a higher level of compensation for publishing advertisements, or other communications, as compared to lower value influencers. Since the influencer has already been graded based on their apparent influence in the neural network their compensation for publishing the communications can be pre-assessed. This makes payment to the influencer predictable and more accurately characterized based on their actual influence. The compensation model may also include payments for user interactions with the communications.

In embodiments, a computer process in accordance with the principles of the present inventions may inspect and map a network (e.g. a particular social network, such as the applications FACEBOOK®, SNAPCHAT®, INSTAGRAM®, TWITTER®, etc.) by gathering publicly publically available information generated in the network. For example, crawling, scraping or other techniques may be used to discover the network's users (e.g. personal accounts, professional accounts, business accounts, public organization accounts, etc.) and also discover contextual information associated with the users (e.g. posts, media posts, comments, user bio information, user profile information, followers of the user currently or in the past, other user's that the user is following currently or in the past, current location, frequented locations, past locations, movement patterns, social network activity level, number of views of particular content, dates of use, dates of views, dates and times of comments, indications of 'likes' or 'dislikes' of content, comments or advertisements, metadata (e.g. edits, deleted posts, etc.) relating to any of the foregoing examples, etc.). The gathered information can be used to generate a map, generally referred to as a neural network, representing the social network's users, contextual information relating to the user's, how the many users are associated with one another, etc. providing insight into how a user may influence other user's and how users are influenced. This neural network can then be further investigated along topical lines. The computer process can search the neural network along a topic or subject matter to narrow the representation of the neural network to represent the network as relating to the subject matter.

The collected, organized and analyzed contextual information may include uncovered deleted posts, comments, etc. It may also include metadata associated with posts, comments, etc. The metadata may describe edits to the information and also help the system understand the effect of the edits (e.g. did more or less people respond positively or negatively to the post before or after editing, is the user being politically correct, or gain other insight into the user).

With the network mapped with users, user information, contextual information relating to users, associations between users, etc. in the neural network, the neural network can be inspected for information about a particular topic through a contextual search engine. A user of the contextual search engine may identify a search topic; such as identifying whom in the network has an interest in or influence over others in a particular topic (e.g. women's tennis shoes). A contextual algorithm can then be run on the neural network to find who are apparent influencers of the topic and who might be interested in the topic. The contextual search of the neural network can generate a new more limited view of the neural network; one that is focused on users that appear to have interest or influence over the search topic. For example, after running the contextual search, a neural network view may be generated that shows apparent influencers of the topic and followers that are apparently interested in the topic. Users that apparently have no influence over the topic and users that appear to have no interest in the topic may be eliminated in this view so we have a targeted subject matter neural network view.

Once a subject matter neural network view is generated, or during the generation, the various users can be graded, scored or otherwise valued as to their influence level and apparent interest level in the subject matter. For example, an identified subject matter influencer may have two million followers but only 200 thousand of those followers appear to have an interest in the subject matter. The fact that they have 200 thousand followers interested in the topic may cause them to be scored highly and the fact that they are also generally regarded highly based on the 2 million followers in general may cause them to be graded higher.

An additional consideration in grading or valuing the user as an influencer may include how many of their followers or followers apparently interested in the subject matter are active users. An active user may be defined in the system as well. An active user may be a user that logs on or is in some way active once a day, week, month, etc. The grading based on the activity level may also use a graduated scale. For example, a follower that is active five times a day may cause a greater influencer score for the identified influencer that a follower that is active once per week.

A contextual search may be used to identify a subject matter by defining it by a natural language sentence or sentence portion, word or term, phrase, image, emoji, video, metadata, etc. With the subject matter described, the contextual search computer process investigates the neural network looking for patterns that indicate interest in the subject, influence over users in connection with the subject, potential interest or influence, etc. To do this, the contextual search engine reviews all of the contextual information (e.g. posts, comments, likes, user profiles, images viewed, images stored, videos viewed, videos stored, audio files, transcribed audio files that can be contextually searched, metadata associated with any of the forgoing, etc.) and associated users in the network to find patterns within the user's activities and between the various users that relate to the search subject matter. For example, a user may have comments, posts, and messages with other users about tennis shoes and this could be used as an indication of interest. Further, the user may have inspired others to have conversations along the same subject matter and this may be used as an indication that the user is an influencer on the topic. Timing of comments, or other interests in the subject matter, in relation to other comments or activities may be assessed and used in the valuation of the comments. If a user's comments caused others to talk about the topic this could be an indication that the user is an influencer so the correlation between the comment and other's comments could be used to grade the user in a positive way.

Each user may be graded or valued based on the contextual information and association with others. Each piece of contextual information may be valued and then they may be evaluated as a collection to place an overall score or value on the total. This may further be time bound. For example, the contextual search and evaluation process may only take into consideration the contextual information generated over the past month or two. It may also take into consideration a larger time period but weight the later time period, closer to the present time, with a higher value. With each piece of contextual information valued and then developing an aggregate score or value of the whole set relating to every user, the neural network can be refined into a subset that describes the influencers and influenced and how they are associated to one another along the subject topic with each user valued based on the contextual information relating to the subject matter. The value can then be used to generate a higher incentive for higher valued influencers.

The contextual search engine may review the contextual information to determine a user sentiment and the sentiment may also be scored or valued. For example, comments from a user may be analyzed to determine what the user thinks about the subject matter. The comments may be positive, negative, indifferent, etc. Emojis and other videos or images may be associated with a positive or negative feedback. Metadata associated with an image or video may also be used to follow who has interacted with it and a sentiment may be drawn based on comments a user makes of the video. The video may be within the search subject matter so a direct inference of sentiment may be drawn between the user's comments on the video and their sentiment of the subject matter. A sentiment score may be attributed to a user and used to further assess the value of the user as an influencer, follower or otherwise interested party. The search could, for example, show that while the person talks about tennis shoes, the person does not like them based on the comments. The sentiment of the user based on the contextual information relating to the subject matter can be used in connection with the other contextual information, values, etc. to further refine the value of the user as an influencer and/or follower.

During the contextual search individual weights, values or scores may be placed on each piece of contextual information to indicate which ones are more important than others. A 'like' may not have the same value as a comment on the subject matter, for example. Some of the values may change over time. For example, a user's location or frequented locations may change over time and be rated differently based on their location during what may be a targeted communication or advertisement targeted communication.

The subject matter neural network can also be investigated for temporal interaction considerations. For example, understanding when subject matter limited users are engaging in topics related to the subject matter of interest. Is it after work, before work, in the evening, near bedtime, in the morning, afternoon evening, day of the week, week of the year, etc? This information can then be used to coordinate when the influencer should send its communications. The system may also be programmed such that the timing of the communications is initiated for the influencer so the influencer does not miss the right timing opportunity. This may be done automatically or manually, or even from a third party service to the influencer. In such a timed communication system, not all users need to receive the communication at the same time. Individual or groups of users may be targeted for delivery at a particular time.

The subject matter neural network can also be investigated for location interaction considerations. For example, where are users are physically located when they have previously interacted with content relating to the subject matter may be used to adapt when the communication from the influencer is to send the communication. This may be done automatically or manually, or even from a third party service to the influencer. In such a timed communication system, not all users need to receive the communication at the same time. Individual or groups of users may be targeted for delivery at a particular time based on their locations.

The subject matter neural network can also be investigated for network connection points where interactions are made. For example, a user may be identified as interacting with content relating to the particular subject matter when the user is connected to a certain router or other network appliance. This information may be used to adapt when the influencer is to communicate the message or advertisement. This may be done automatically or manually, or even from a third party service to the influencer. In such a timed communication system, not all users need to receive the communication at the same time. Individual or groups of users may be targeted for delivery at a particular time based on which network access point they are connected to.

In searching the neural network along a particular search topic looking for influencers or followers of the topic, the computer system may compare the targeted search topic to the contextual information of the neural network. The topical search can review all of the gathered contextual information from each of the users to gain an understanding of which users promote content along the subject, interact with content along the subject, have followers that are interacting with content along the subject, commenting on the subject, etc. The search process can review all of the contextual information in a way that prioritizes certain information over other information in determining the overall influencer impact of the subject matter. For example, a producer of content along the subject of interest may be an indication that the producer is an influencer, but a set of followers with comments and other interactions amongst themselves and with a producer(s) is possibly more indicative of people being influenced. It further may not only be based on the 'following' but on how people are commenting and sharing the content that may provide the better clues on who is the bigger influencer. For example, a follower of the NIKE® corporation may be consuming NIKE® sports related content but the follower may also be chatting a lot with other followers or followers not following the NIKE® corporation about what she is finding interesting in the sports category. This follower may have a lot of influence over her followers and even entities that she is following. So this person may be ranked fairly high in the influencer category for the subject matter of interest. The best way to find the influencers may be to consider each user in the network, along with contextual information surrounding them and their associations with other users, and analyzing it to determine patterns that suggest their interest and/or influence over a particular topic. Finding the real influencers is very important. Further, finding users that are actually interested in the subject is also very important. With a good understanding of who the real influencers are and who is actually interested in the subject matter, users can find more relevant information and advertisers can find the interested users. This makes communications (e.g. advertising) more efficient and more effective.

Figure 2:
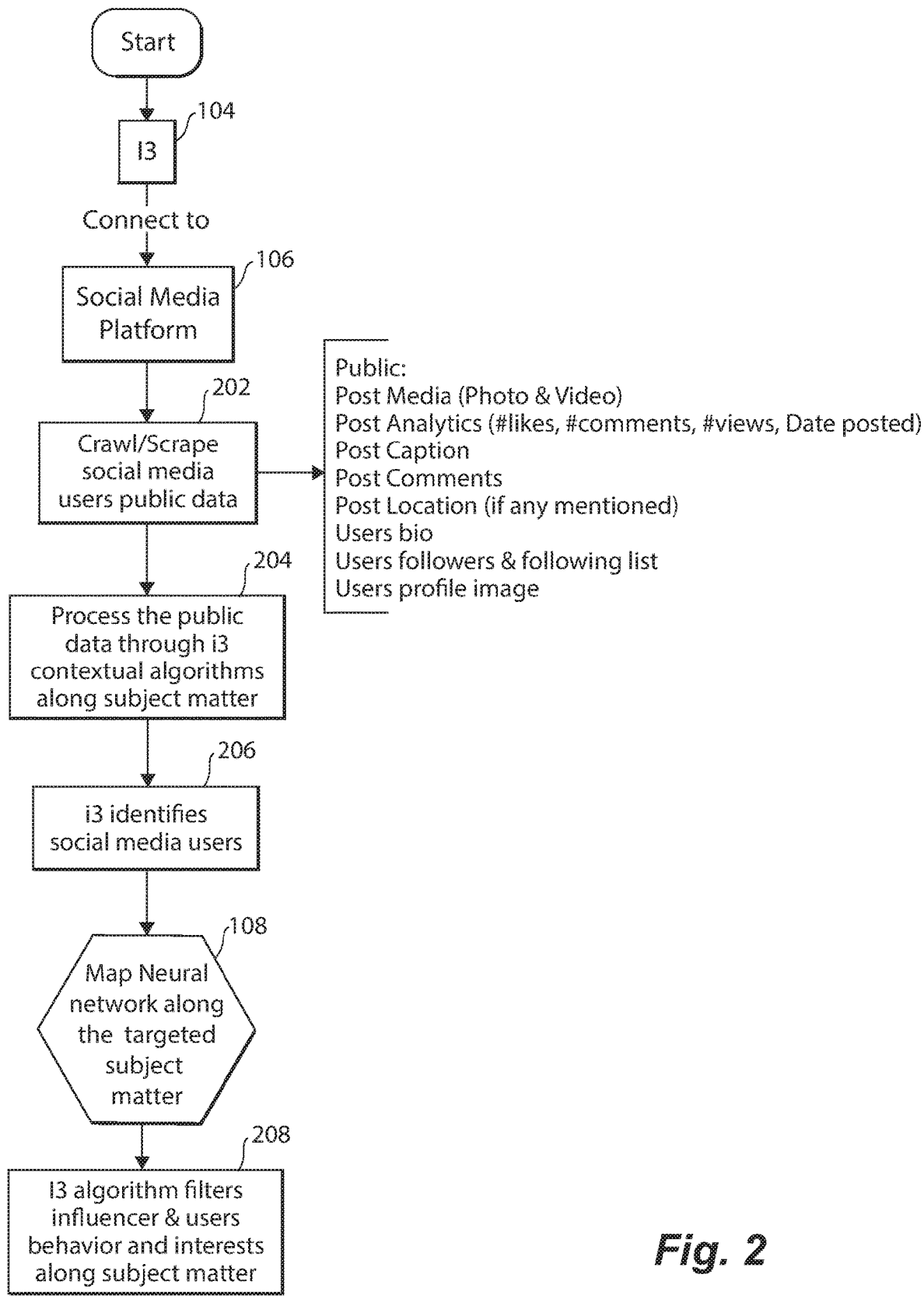
FIG. 2 illustrates a flow chart for a computer process for developing a subject matter limited neural network in accordance with the principles of the present inventions.

FIG. 2 illustrates a neural network development process in accordance with the principles of the present inventions. As with FIG. 1, the influencers computer product 104 connects to a social media platform 106 to ultimately generate the neural network 108. FIG. 2 illustrates the steps to developing the neural network 108 in more detail. Once connected to the social media platform, the influencers computer product 104 extracts publically available information from the social media platform. As indicated, this may be done through processes known as crawling, scrapping, etc. 202 to gather the contextual information pertaining to the users of the social media platform. Once the user information and contextual information is gathered, a neural network representing the associations and information relating to users may be formed. The data underlying the neural network is then processed through contextual algorithms along a pre-determined subject matter or topical subject matter to identify the users of interest 206. The users of interest can further be ranked, graded, scored, valued or otherwise assessed for their influence impact or their following propensities along the topic subject matter to create the subject matter specific neural network. Further, the subject matter specific neural network may be filtered to assess each influencer and user in the subject matter limited network 208.

The filtering step 208 may be used to develop a more detailed understanding of each influencer and follower in the subject matter limited neural network. Once we have the subject matter limited neural network, we have a picture of who is influencing whom and who is interested in the particular subject matter that was searched. Filtering is a step of evaluation where the contextual information and associations between various users is evaluated and graded to develop scores or values of each piece of information and a score or value of the aggregation of the information. These scores can then be used to generate a score or value for each influencer and interested user in the subject matter limited neural network. This forms an additional layer or view of the subject matter limited neural network, a view that included values of each participant.

While embodiments use the term "filter" to describe the further investigation into one or more users that are included in the subject matter limited neural network, it should be understood that this step may be accomplished using a contextual search engine, filter, or other system that is programmed to make the investigation.

In embodiments, the filtering step that further investigates each user in the subject matter limited neural network, which could also be done in conjunction (e.g. at the same time, before or after) with making the subject matter limited neural network, could have multiple steps, each one further refining the understanding of the user. For example, the filtering step may evaluate the users as a first cut to identify recently active users. Then the system may take that subset of users and look for ones that have a particular interest. The filtering may be done multiple times over a period of time to understand how the user(s) change over time. This multi-level filtering may be designed to refine the understanding of the influencers and users that appear interested in the subject matter. The step of filtering may further include developing new contextual information by deploying an agent to interact with the identified user(s) (e.g. as described herein). Following the collection of new contextual information, the system may then further filter the results to grade the users.

In embodiments, the establishment and refinement of the subject matter limited neural network is a dynamic process that generates new information over time. The systems described herein may be fast and thorough such that the contextual search or other searches can be repeated to find new information about users and their contextual information. For example, a user, between today and tomorrow, may add posts to his account and the posts may affect his score as an influencer or person interested in the subject matter. The user may also have additional followers, delete followers, edit posts, remove posts, make new posts make new comments, etc. and capturing these over time and refining the model of the users in the subject matter limited neural network can be very important and impactful.

In embodiments, the contextual search is adapted to identify not just users with an apparent interest and/or influence relating to a subject matter, but it may also identify users that follow those identified as having an interest and/or influence and followers of those followers. This is a form of deep learning or depth of analysis. This can be helpful in understanding both the top level user, that is the one with apparent interest and/or influence, and those other users connected both directly and indirectly to the top level user. For example, a first user may be identified as an influencer of the search topic. A second user may be identified as a person interested in the search topic and the second user may be a follower of the first user. The second user may further have many followers, some may have an apparent interest in the subject and some may not. It is possible that those with an apparent interest become identified separately. The one with no interest could be cut out from the analysis entirely, however, knowing that they are followers, or otherwise associated with (e.g. through comments, posts, etc.), with a user of interest is in itself useful to the analysis. The impression or characterization of the first and/or second user, in this example, may be altered based on the non-interested and/or apparently interested users. This analysis can go as deep into the tree of followers or associated users as is interesting to go. This process may be referred to as a hierarchical identification of directly and indirectly associated users. Similarly, because the followers down deep in the tree (e.g. a follower of a follower of a follower of the second user in this example) are in some way directly or indirectly associated with a user of interest, the user deep down in the tree can be analyzed, characterized and scored. Further, the user deep down in the tree may be the subject of an agent (as described herein) interaction to gain more information. This process may turn an otherwise apparently irrelevant user, with respect to the search criteria, into a relevant user. The user may then be added to the database as an interested user or influential user. As another example, carrying on with the first and second user example above, since a user deep down in the tree is associated in some way with the first and/or second user the user deep down in the tree may become a subject to watch because they may be influenced by either the first or second user. This deep learning about the many direct and indirect intertwined users can further be updated as described herein to maintain a real-time database that identifies all those that may be, even tangentially, influenced along the subject line. Each can further be scored or rated such that they can be followed and/or targeted with messaging.

With the subject matter limited neural network valuation view, individual influencers can be signed up to pass along communications related to the subject matter of interest and the influencer can be compensated based on their calculated value along with their later performance.

The valued subject matter limited neural network, or in some embodiments, the non-valued view, can be used to not only understand who the influencers are, it can identify which users are interested in the targeted subject matter. In the valued view, the system can also understand which users have a high, medium, low (or other grading or value scaling) interest in the subject matter. This can be used to help target communication from the influencer. For example, if the influencer is hired to deliver a communication or advertisement because the influencer has been assessed as an influencer by the system, the influencer can target its users that have an interest in the subject matter based on the subject matter limited neural network. This can be used to target the communications to people that have an interest while not bothering others. It could also be used to target interested users with one form of communication and other users with another form of communication. For example, user's apparently interested in tennis shoes may receive an advertisement to a particular new shoe design and user's that show little or no interest may receive an advertisement about tennis in general as a way of trying to inspire interest with the apparently non-interested user.

Figure 3:
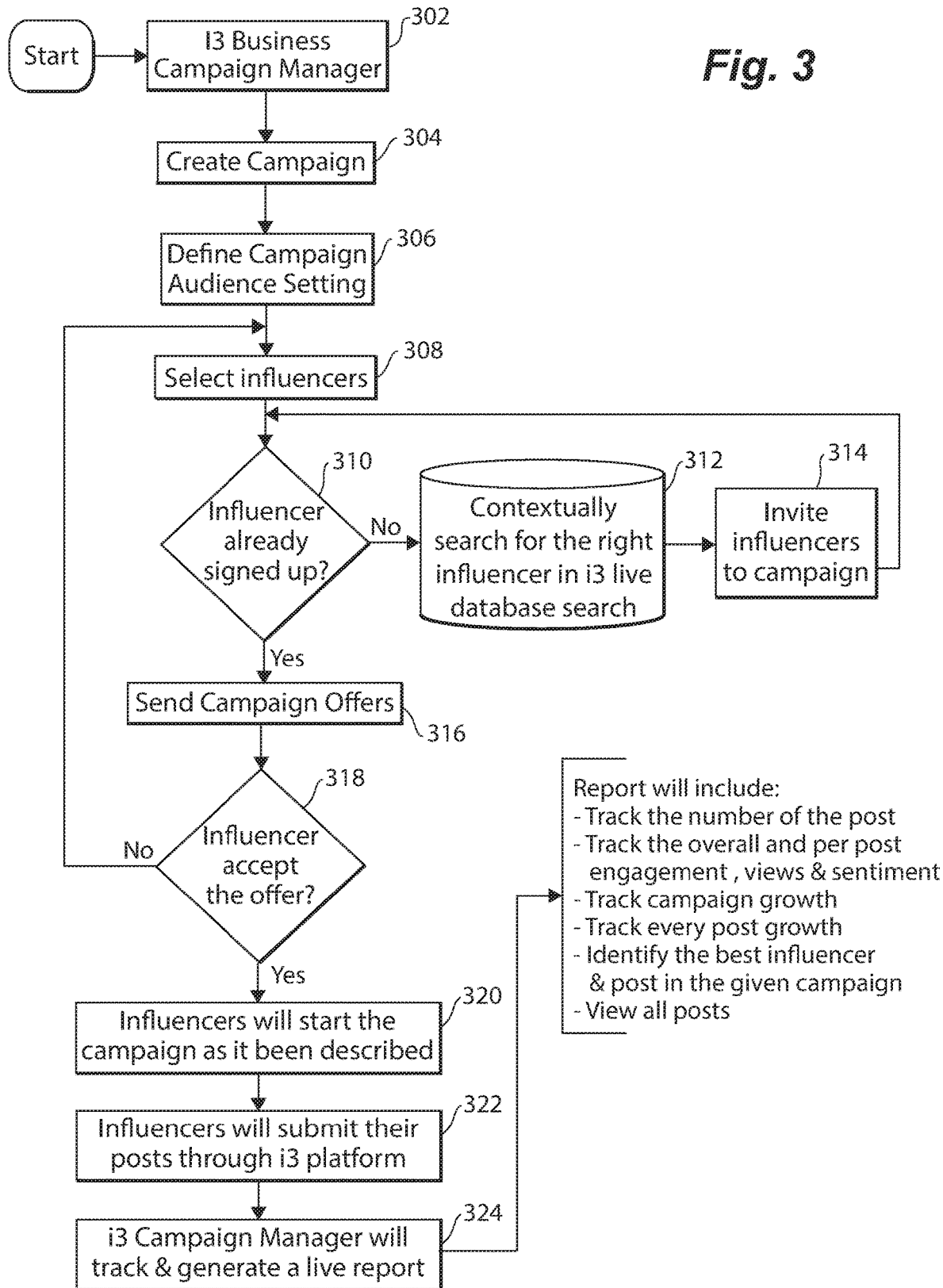
FIG. 3 illustrates a flow chart for a computer process for running a commercial targeted communication through a subject matter limited neural network in accordance with the principles of the present inventions.

FIG. 3 illustrates a commercial process for the distribution of a targeted communication (e.g. an advertising targeted communication, political messaging, news distribution, etc.). The process depicted in FIG. 3 is run in the social media platform 106 once the subject matter specific neural network 108 has been generated. A targeted communication manager software product 302 is used to create a targeted communication 304 by defining the targeted communication audience 306 and selecting the influencers from the neural network 108. Influencers in this commercial process may be signed up such that they can be compensated or otherwise participate in the program. Step 310 determines if the desired influencer is already signed up. If not, an additional search for the influencer may be done 312 and then the influencer may be invited into the targeted communication 314. Targeted communication offers can then be sent to the influencers 316. The targeted communication offer may be different for different influencers. For example, the targeted communication offer to a highly rated influencer of the subject matter may include a higher compensation package as compared with a lower rated influencer. In this system, since the influencer has a known or estimated influence based on the subject matter neural network, compensation for the targeted communication can be higher or different than a targeted communication offered to un-quantified influencers. The influencer will than start the targeted communication as it has been described 320 and influencers can submit their posts through the influencer platform 322 so they can be properly tracked. A targeted communication manager can further track and generate live reports on the offers from the influencers and the reactions from others.

After a targeted communication is deployed and the social network's users begin to see the targeted communication, they may start to develop new contextual information that adds to the neural network and subject limited neural network. These additions can be used to further the targeted communication by identifying new influencers and/or followers. Also, the process of reviewing the contextual information in generating the neural network can also be used to decipher the impact of the targeted communication by processing the new contextual information. For example, users may start chatting about what they saw in the targeted communication, for good or bad, and the chats can be analyzed, in conjunction with who the user is and how influential they are, to see how impactful or effective the targeted communication is.

Figure 4:
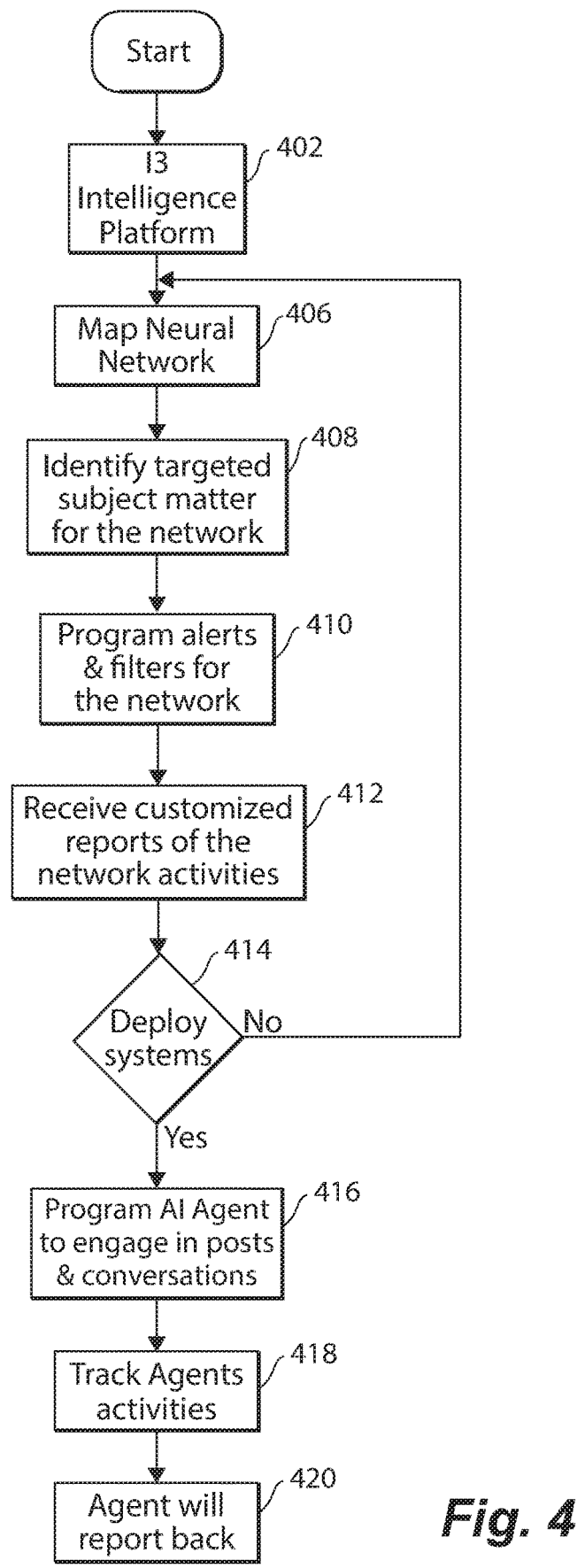
FIG. 4 illustrates a flow chart for a computer process for running an intelligence process through a subject matter limited neural network in accordance with the principles of the present inventions.

FIG. 4 illustrates an intelligence program designed to track the activities of a user of a social network. The intelligence platform 402 maps the social network 406 and identifies targeted subject matter 408 in a similar way as has been described herein. The system would then be programmed to provide alerts 410 to identify users that are apparently interested in the targeted subject matter 410 and to provide customized reports for the user's activities. In addition to tracking the users, the system may deploy an agent 414 to artificially interact with the user. In embodiments, the agent involves human interaction to customize the interactions with the identified user. The agent may engage in posts and conversations and track the user's activities 418. The agent can then be programmed to report the interactions back to an administrator 420.

Figure 5:
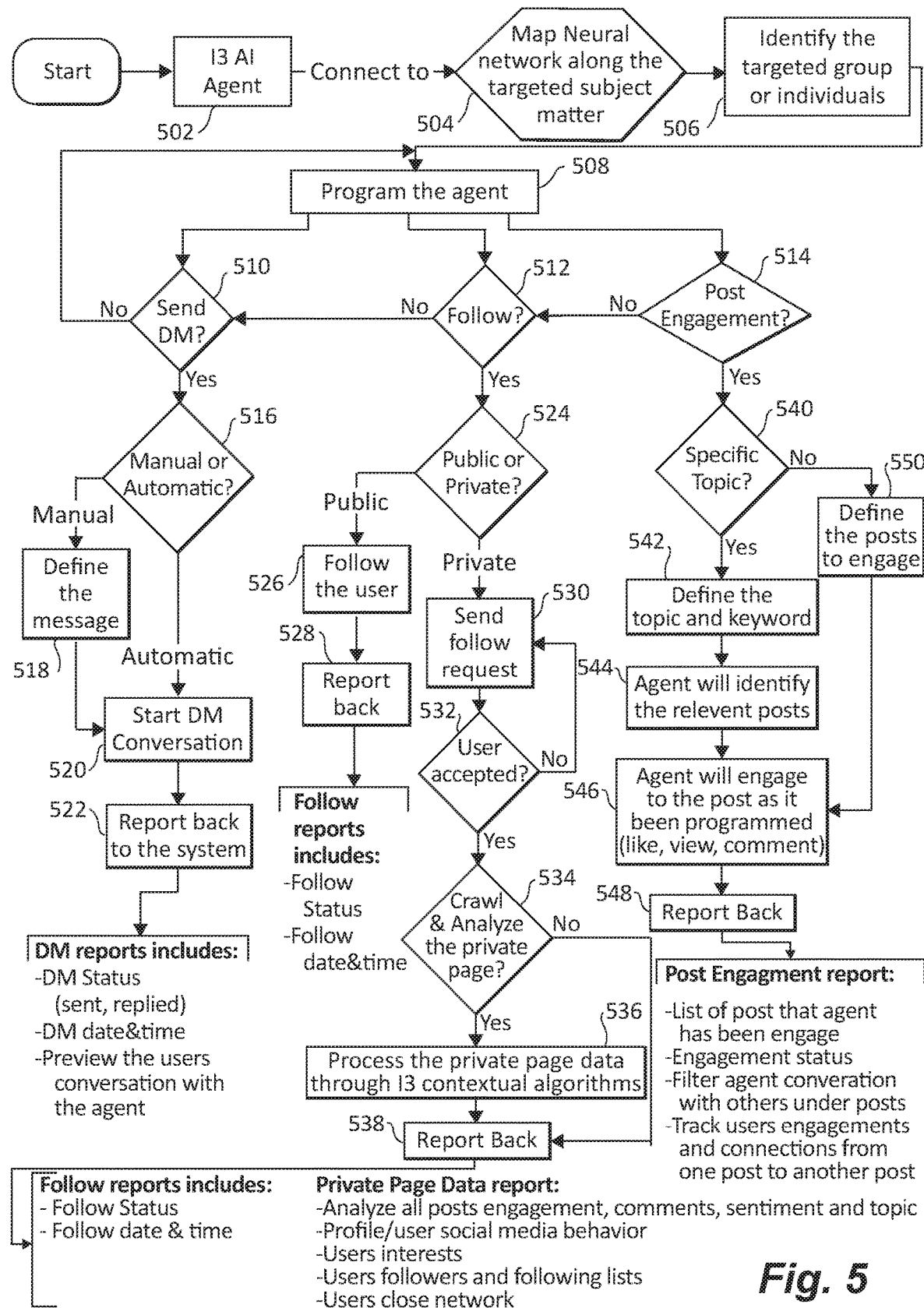
FIG. 5 illustrates flow chart for a computer process allowing an agent to be introduced and act in a system in accordance to the principles of the present inventions.

FIG. 5 illustrates an example of how an agent may be introduced and act in the system in accordance to the principles of the present inventions. The agent 502 may connect to the subject matter limited neural network data 504 (e.g. through an online connection or directly, or otherwise). The subject matter limited neural network data may have developed by searching, through a contextual search engine as described herein, and certain groups or individuals may have been identified such that they can be the subject of interaction with the agent 506. Individuals or groups would typically include users that have been identified as interested in the searched subject matter. These may be user's interested in an advertisement, group message, political interest, purchase of particular goods or services, nefarious activities, group activities, etc. With the group or person's identified, the agent may be programmed to act in a particular way, send particular messages, learn in a particular way (e.g. through machine learning), etc. 508. The agent may be programmed to adapt to the user in a way that influences the agent itself and/or in a way that influences the user.

The agent may send a direct message to the user(s) 510, follow the user(s) 512, engage with a user(s) post 514, etc. In the event that the agent is programmed to direct message the user 510, it may initiate a manual or automatic direct messaging process 516. If it is automatic, the agent itself determines the message through its pre-programming and machine learning based on interactions with the user or similar users. If it includes manual intervention, a human may define the message or refine a message generated by the agent 518. Then the direct messaging starts 520. The direct messaging targeted communication may continue and be refined (e.g. through machine learning and/or human intervention) and reports may be generated for the user of the system 522.

The agent may be programmed to follow the user 512. In this situation, the agent may determine if the user is public or private 524 before deciding how to proceed. If the user is public, the agent may begin to follow 526 and report back to a user of the system 528. If the user is private, the agent may send a follow request to the user 530. The agent may be programmed or learn from other similar user interactions how to introduce itself or pose when sending the follow request. If the user accepts the follow request 532 then the agent may be programmed to crawl, scrape, etc. all available private information and analyze the data 534. The data may then be processed through the contextual search process (as defined herein) to identify data that relates to the search topic 536 and report back 538. This data may be used to form a subject matter specific profile of the user.

The agent may be programmed to engage with the user's posts, comments, etc. 514. If the posts are public, the agent may pose as an interested public user. If the posts are private, the agent may be programmed to send a follow request or otherwise become engaged privately. The agent may select which posts to interact with based on their relation to a search topic of interest, so the posts may be processed through a contextual search based on a particular topic. The agent may identify a specific topic of interest 540, define an interaction topic, keywords, etc. 542 and identify relevant posts 544. The agent may be programmed to interact with the identified posts to engage the user 546. The agent may be designed to learn, e.g. though machine learning, from user interactions or other similar user interactions how to comment, like, view, interact, etc. with the post 546 and report back 548.

Aspects of the present inventions relate to subject matter limited neural network maps identifying a user selected from a plurality of users of a social network that have been identified as being interested in a search subject based on a contextual search of publically available contextual information relating to each of the plurality of users. In embodiments it further includes an agent programmed to interact with the identified user, wherein the interaction is adapted to gain information about the user's status. In embodiments, the information about the user's status provides an indication of how active the user is currently, over the past period of time (e.g. hour(s), day(s), month(s), year(s)). In embodiments, the information about the user's status provides an indication of how active the user is with respect to the searched subject during the period of time that is of interest to the investigator.

Aspects of the present inventions relate to subject matter limited neural network map identifying a user selected from a plurality of users of a social network that have been identified as being influential on a topic, wherein the user is identified through a search subject based on a contextual search of publically available contextual information relating to each of the plurality of users. It may further include an agent programmed to interact with the identified user, wherein the interaction is based on the search subject and designed to gain an understanding of how the user acts, interacts and appears in general or in regards with the search subject in particular. In embodiments, the agent's interactions are adapted to gather information from the influential user indicative of the influential user's level of engagement with the search subject.

Figure 6:
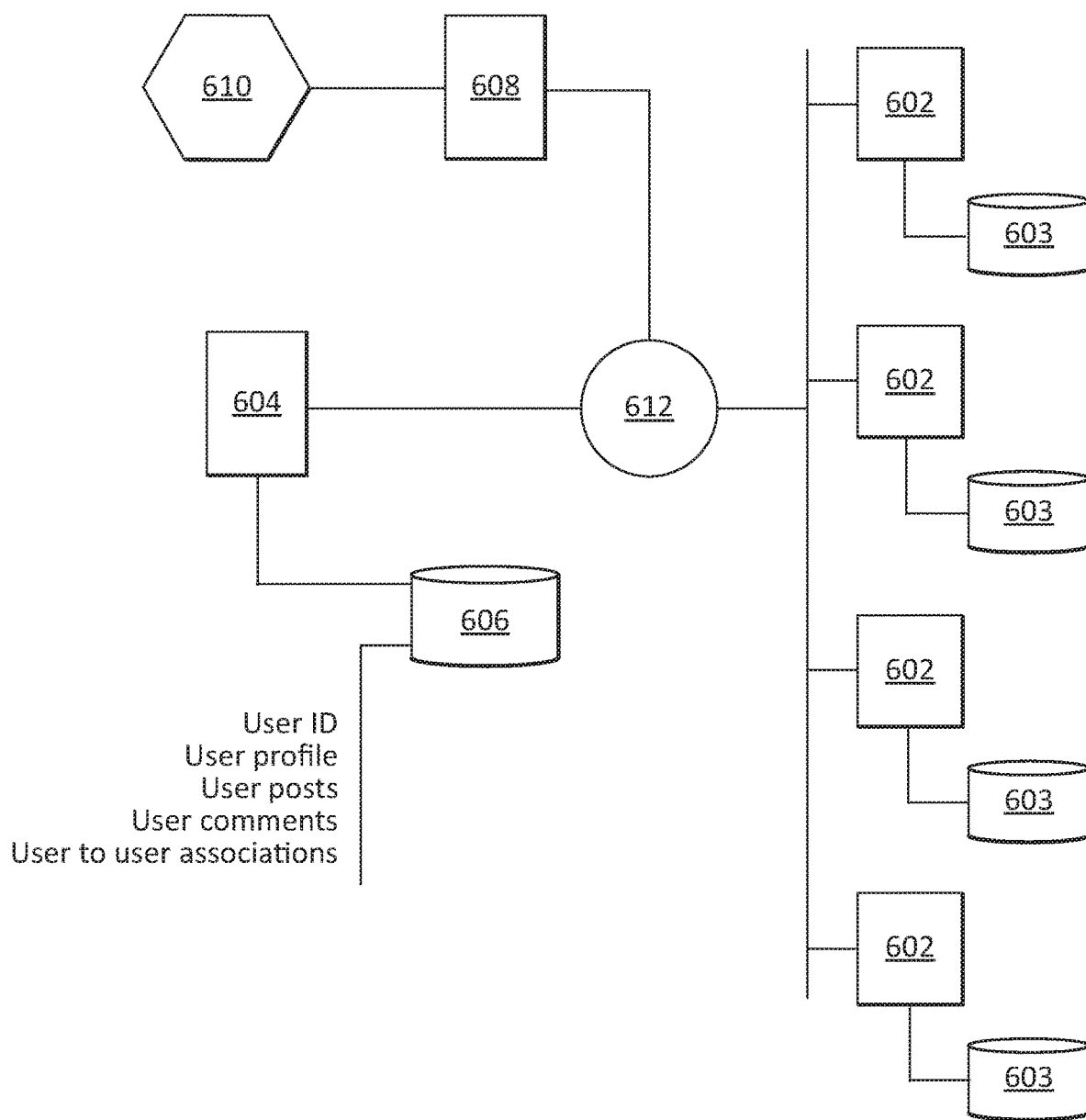
FIG. 6 illustrates a social network and investigation software system in accordance with the principles of the present invention For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

FIG. 6 illustrates a social network and investigation software system in accordance with the principles of the present invention. A social network (e.g., FACEBOOK®, TWITTER®, INSTAGRAM®, or other collection of users in a network, etc.) may be operated through a remote service on a server based computer system 604. Users may use a computer device 602 (e.g. a phone, desktop, laptop, tablet, etc.) to connect to the remote service computer system 604 through a network 612 (e.g. the Internet, local area network, large area network, peer to peer network, etc.). The various users 602 may be associated with one another (e.g., as friends, followers, reviewers of comments, posts and the like, etc.) and may be themselves followers, friends, influencers, etc. Data associated with the various users may be stored in a database locally to the user's device(s) 603 and/or in a database 606 that is associated with the computer system that is operating the social network software service 604. User data may include a user ID, user profile information, user interactions with other users and/or the social network, posts, comments, etc. (e.g. as described herein). A computer system 608 may operate the influencers computer program 104 and the computer system 608 may connect to the network 612 to obtain the information as described herein. The computer system 608 may also operate the influencers computer program 104 to copy and organize data taken from the social network computer system 604 and/or user's computers 602 to generate the neural network view and subject matter limited neural network view 610 as described herein.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The invention claimed is:

1. A computer system, comprising:
one or more processors;
one or more nonvolatile storage mediums storing, individually or in combination, instructions for execution by the one or more processors;
a first computer module in the computer system that operates to:
perform a search of contextual information stored in one or more nonvolatile storage mediums of a social network, wherein the contextual information is associated with a plurality of users of the social network;
identify contextual information related to a search subject and time stamps indicative of when the contextual information related to the search subject is generated in the social network;

generate a subject matter limited neural network map of the social network, wherein the neural network map includes the contextual information related to the search subject, an identification of a subset of users selected from the plurality of users of the social network associated with the contextual information related to the search subject, and connections between the subset of users and the plurality of users; and a targeted communication manager in the computer system that operates to:

determine an effective time, using the time stamps, to distribute a communication relating to the search subject to the subset of users.

2. The computer product of claim 1, wherein the effective time is a time of day and wherein the targeted communication manager operates to:

determine, using the timestamps, a time of day that the subset of users are active and engaging with the contextual information related to the search subject; and determine the effective time using the determined time of day.

3. A computer system, comprising:

one or more processors;

one or more nonvolatile storage mediums storing, individually or in combination, instructions for execution by the one or more processors;

a first computer module in the computer system that operates to:

perform a search of contextual information stored in one or more non-transitory storage mediums of a social network, wherein the contextual information is associated with a plurality of users of the social network;

identify contextual information related to a search subject and a plurality of influencers that influence other users of the plurality of users to interact with the contextual information related to the search subject, wherein the plurality of influencers are a subset of the plurality of users of the social network; and determine a time of activity in the social network of each of the plurality of influencers;

generate a subject matter limited neural network map describing the contextual information related to the search subject, the plurality of influencers, and connections between the plurality of influencers and the plurality of users; and a targeted communication manager in the computer system that operates to:

determine an effective time, using the time of activity in the social network of each of the plurality of influencers to distribute a communication relating to the search subject to the plurality of influencers.

4. The computer system of claim 3, wherein the targeted communication manager further operates to:

determine an individual effective time for the first one of the plurality of influencers using a time of activity in the social network of the first one of the plurality of influencers; and distribute an individual communication to the first one of the plurality of influencers at the individual effective time.

5. The computer system of claim 3, wherein the targeted communication manager in the computer system further operates to:

distribute the communication relating to the search subject to the plurality of influencers at the effective time; and determine one or more of the plurality of influencers has posted new contextual information in the social network in response to the communication.

6. The computer system of claim 5, wherein the first computer module in the computer system further operates to:

after the distribution of the communication, identify newly generated contextual information in the social network that is generated after distribution of the communication and relates to the search subject; and generate an updated neural network map that includes the plurality of user accounts that interact with the communication and/or the newly generated contextual information relating to the search subject and connections between the plurality of user accounts and the plurality of influencers.

7. The computer system of claim 6, wherein the first computer module in the computer system further operates to:

identify at least a first user account of one of the plurality of users that has an interaction with the targeted communication and/or the newly generated contextual information relating to the search subject, wherein the interaction includes one or more of: a posted comment, a posted emoji, a posted image, a posted like, a posted video, or a view of a posted image or video.

8. The computer system of claim 7, wherein the first computer module in the computer system further operates to:

automatically follow the first user account when the first user account is public; and automatically transmit a follow request to the first user account when the first user account is private.

9. The computer system of claim 6, wherein the first computer module in the computer system further operates to:

identify a new influencer from the plurality of users, wherein the new influencer influences other users of the plurality of users to interact with the newly generated contextual information related to the search subject.

10. The computer system of claim 3, wherein the contextual information includes one or more of: audio files, video files, images, metadata for audio files, video files, and/or images, emojis, posts, likes, comments, user profile data, and text in one or more posts to the social network.

11. The computer system of claim 3, wherein the connections between the plurality of influencers and the plurality of users includes one or more of: a follower, a follower of a follower, a friend, and a friend of a friend.

12. A method of a computer system, wherein the computer system includes one or more processors and one or more non-transitory storage mediums having stored thereon, individually or in combination, instructions that when executed by the one or more processors, causes the computer system to perform one or more functions, comprising:

electronically accessing by the computer system via a wide area network, a third party computer system hosting a social network, wherein the social network includes one or more databases stored in the third party computer system including a plurality of user accounts and contextual information associated with the plurality of user accounts;

performing, using the computer system, a search of the one or more databases of the social network stored in the third party computer system for contextual information relating to a predefined search subject;
evaluating, using the computer system, the contextual information relating to the predefined search subject to identify a plurality of influencer accounts, wherein the plurality of influencer accounts is a subset of the plurality of user accounts and wherein the plurality of influencer accounts influences other user accounts of the plurality of user accounts to interact with the contextual information relating to the predefined search subject;
determining a time of activity in the social network of one or more of the plurality of influencer accounts;
generating a subject matter limited neural network map including the contextual information related to the search subject, the plurality of influencer accounts, and connections between the plurality of influencers and the plurality of users;
determining an effective time, using the time of activity in the social network of the one or more of the plurality of influencer accounts, to distribute a targeted communication relating to the predefined search subject to the plurality of influencer accounts; and
distributing the targeted communication by the computer system to the plurality of influencer accounts at the effective time.

13. The method of the computer system of claim 12, further comprising:
identifying time stamps indicative of when the contextual information related to the search subject is generated in the social network; and
determining the effective time using the time stamps and the time of activity in the social network of the plurality of influencers.

14. The method of the computer system of claim 13, further comprising:
determining one or more of the plurality of influencers has generated new contextual information in the social network in response to the targeted communication.

15. The method of the computer system of claim 13, further comprising:
after the distribution of the targeted communication, identifying newly generated contextual information in the social network that is generated after distribution of the targeted communication and relates to the search subject; and
generating an updated neural network map that includes a plurality of user accounts that interacted with the targeted communication and/or the newly generated contextual information relating to the search subject.

16. The method of the computer system of claim 15, further comprising:
identifying at least a first user account of the plurality of user accounts that has an interaction with the targeted communication and/or the newly generated contextual information relating to the search subject, wherein the interaction includes one or more of the following: a posted comment, a posted emoji, a posted image, a posted like, a posted video, or a view of a posted image or video.

17. The method of the computer system of claim 16, further comprising:
automatically following the first user account when the first user account is public; and
automatically transmitting a follow request to the first user account when the first user account is private.

18. The method of the computer system of claim 13, wherein the contextual information includes one or more of: audio files, video files, images, metadata for audio files, video files, and/or images, emojis, posts, likes, comments, user profile data, and text in one or more posts to the social network.

19. The method of the computer system of claim 13, wherein the connections between the plurality of influencer accounts and the plurality of user accounts includes one or more of: a follower, a follower of a follower, a friend, and a friend of a friend.

20. The method of the computer system of claim 13, further comprising:
generating by the computer system a sentiment score for each user account of the plurality of user accounts interacting with the targeted communication and/or newly generated contextual information relating to the predefined search subject;
generating by the computer system an overall effectiveness of the targeted communication using the sentiment score for each user account of the plurality of user accounts interacting with the targeted communication and/or the newly generated contextual information relating to the predefined search subject.

* * * * *